United States Patent [19]

Beatenbough

[11] 4,369,340

[45] Jan. 18, 1983

[54] WALL TELEPHONE ADAPTER ASSEMBLY

[75] Inventor: Charles M. Beatenbough, Buford, Ga.

[73] Assignee: Bell Telephone Laboratories, Incorporated, Murray Hill, N.J.

[21] Appl. No.: 184,048

[22] Filed: Sep. 4, 1980

[51] Int. Cl.³ .................................... H04M 1/11
[52] U.S. Cl. ............................................ 179/146 R
[58] Field of Search ............ 179/1 PC, 100 R, 100 C, 179/100 D, 146 R, 178, 179; 174/48, 58, 59

[56] References Cited

U.S. PATENT DOCUMENTS

| | | | |
|---|---|---|---|
| 3,840,711 | 10/1974 | Tucker | 179/146 R |
| 3,845,252 | 10/1974 | Wooters | 179/146 R |
| 3,848,097 | 11/1974 | Tucker | 179/146 R |
| 3,851,119 | 11/1974 | Tucker | 179/146 R |
| 3,898,394 | 8/1975 | Ward et al. | 179/146 R |
| 4,047,787 | 9/1977 | Gumb et al. | 339/154 A |

Primary Examiner—Joseph A. Popek
Attorney, Agent, or Firm—W. H. Kamstra

[57] ABSTRACT

A customer installable adapter assembly (10) which mounts between a wall jack outlet (14) and a wall mounted telephone set (12) to provide a jack (27) terminated extension cord (26) access to the wall jack outlet (14). The adapter assembly (10), which is provided with its own mounting studs (23, 24) for retaining the telephone set (12), is itself retained by the mounting studs (15, 16) of the wall jack (14). The adapter assembly (10) features a locking mechanism to prevent its inadvertent removal when the telephone set is removed, comprising a hinged lid (34) covering one of the wall jack studs (16) and the keyhole aperture (31) of the adapter assembly through which the latter is maintained on the stud (16). The lid (34) has extending from its inner face a lug (59) which, when the lid (34) is closed, fits into the open area of the keyhole aperture (31) to abut against the flanged head of the mounting stud (16). The latter is thus prevented from being moved back into the keyhole aperture (31) open area thereby preventing inadvertent removal of the adapter assembly (10) when the telephone set (12) is removed.

5 Claims, 5 Drawing Figures

WALL TELEPHONE ADAPTER ASSEMBLY

TECHNICAL FIELD

This invention relates to wall-mounted telephone station apparatus and more particularly to adapter assemblies for such apparatus designed to permit customer installation of and additions to the station apparatus.

BACKGROUND OF THE INVENTION

Telephone customers have recently been offered the service option of making their own installation changes and desk sets having cords which may be plugged in at various points on the customer premises having suitable jacks provided therefor are well known. This obviously represents considerable savings to a customer since the expense of an installer visit is obviated. Wall-mounted telephones which may be readily installed or removed from wall plate receptacles are also now familiar and have offered particular convenience to customers demanding more choice in the telephone location. In such arrangements, wall plate receptacles are permanently mounted at desired points on the customer premises, which receptacles provide outlet jacks for the permanent telephone wiring. A pair of vertically aligned, flanged mounting studs are provided on the face of the wall plate. The telephone set is then simply mounted by fitting a pair of corresponding slotted apertures in the telephone set backplate over the studs and sliding the slots downward behind the stud flanges. Wiring connections are simultaneously made by a plug extending from the telephone backplate, which plug is adapted for adjustable insertion in the wall plate jack. In one prior art arrangement disclosed in the patent of R. C. Ward et al., U.S. Pat. No. 3,898,394 issued Aug. 5, 1975, an adapter assembly is provided to which a wall-mounted telephone set, previously permanently affixed, may be permanently attached. The adapter may then be removably mounted on the wall plate as described in the foregoing. This arrangement initially requires tools and skills of the same level required of the installer who made the original permanent wall installation.

In some cases, a customer may request more flexibility than that offered even by a virtually portable telephone of the character described in the foregoing. Thus, for example, with a removable wall telephone set mounted in one room, a customer may require a self-installable extension telephone at a distance from the first telephone in the same room or in an adjoining room. One prior art extension cord for multiple plug-in telephones is disclosed in the patent of B. W. Gumb et al., U.S. Pat. No. 4,047,787 issued Sept. 13, 1977. The cord arrangement there described provides for a single plug at one end of the cord and a junction box at the other having a pair of paralleled jack outlets. A cord arrangement of this character is manifestly not compatible with a wall-mounted telephone set where the single wall jack is already occupied by the telephone set plug. It is thus one objective of the present invention to provide a customer installable wall-mounted telephone adapter assembly which permits the connection of an extension telephone for location at a distance from the first telephone. In the design of any such customer installable equipment, a number of factors must be taken into consideration. The level of skill and the availability of the proper tools, for example, may be limited for many customers. With respect to an adapter assembly specifically, it may not be immediately recognized that the adapter and the wall-mounted telephone are separate units. Thus, some means must be provided to ensure that both are not removed from the wall when only the telephone set is to be moved. It is to these and other problems to which the adapter assembly of the invention is chiefly directed.

SUMMARY OF THE INVENTION

The foregoing objectives are realized in one illustrative adapter assembly for providing jack-ended extension cord access to a removable wall-mounted telephone according to the invention in which the adapter is customer mounted on the wall plate mounting studs previously retaining the wall telephone. The adapter assembly, in addition to containing the necessary wiring for the extension, also provides corresponding mounting studs for the subsequent mounting of the telephone set. In the mounting stud arrangement, conventionally a pair of keyhole apertures in the backplate of the adapter and telephone set are of sufficient diameter to admit the flanged head of the studs. After the backplates are thus fitted about the studs, the units are moved downward, the flanged stud heads being captured behind the flanged sides of slots extending upward from the backplate keyhole apertures. According to one feature of the adapter assembly, its inadvertent removal from the wall plate mounting studs is advantageously prevented by a cover lid hingedly mounted on the face of the assembly. As the lid is closed, a projection or lug extending inwardly from the lid fits into one of the mounting stud apertures. As a result, any upward, and, therefore, dismounting movement of the adapter assembly is prevented as the flanged head of a mounting stud is trapped by the lid projection. The lid is normally covered by the subsequent mounting of the wall telephone over the entire face of the adapter assembly. The telephone and adapter assembly can thus be dismounted only separately, the adapter remaining fixed when the telephone is removed. The extension cord extending from the adapter assembly may advantageously have its jack affixed to the wall baseboard, for example, by a suitable adhesive provided on its backplate surface. No tools are required for the aforedescribed installation and only minimum skill is required to mount the units on the mounting studs.

BRIEF DESCRIPTION OF THE DRAWING

The organization and installation of an adapter assembly according to the invention will be better understood from a consideration of the detailed description of one illustrative embodiment thereof which follows when taken in conjunction with the accompanying drawing in which.

DETAILED DESCRIPTION

Figure 1:
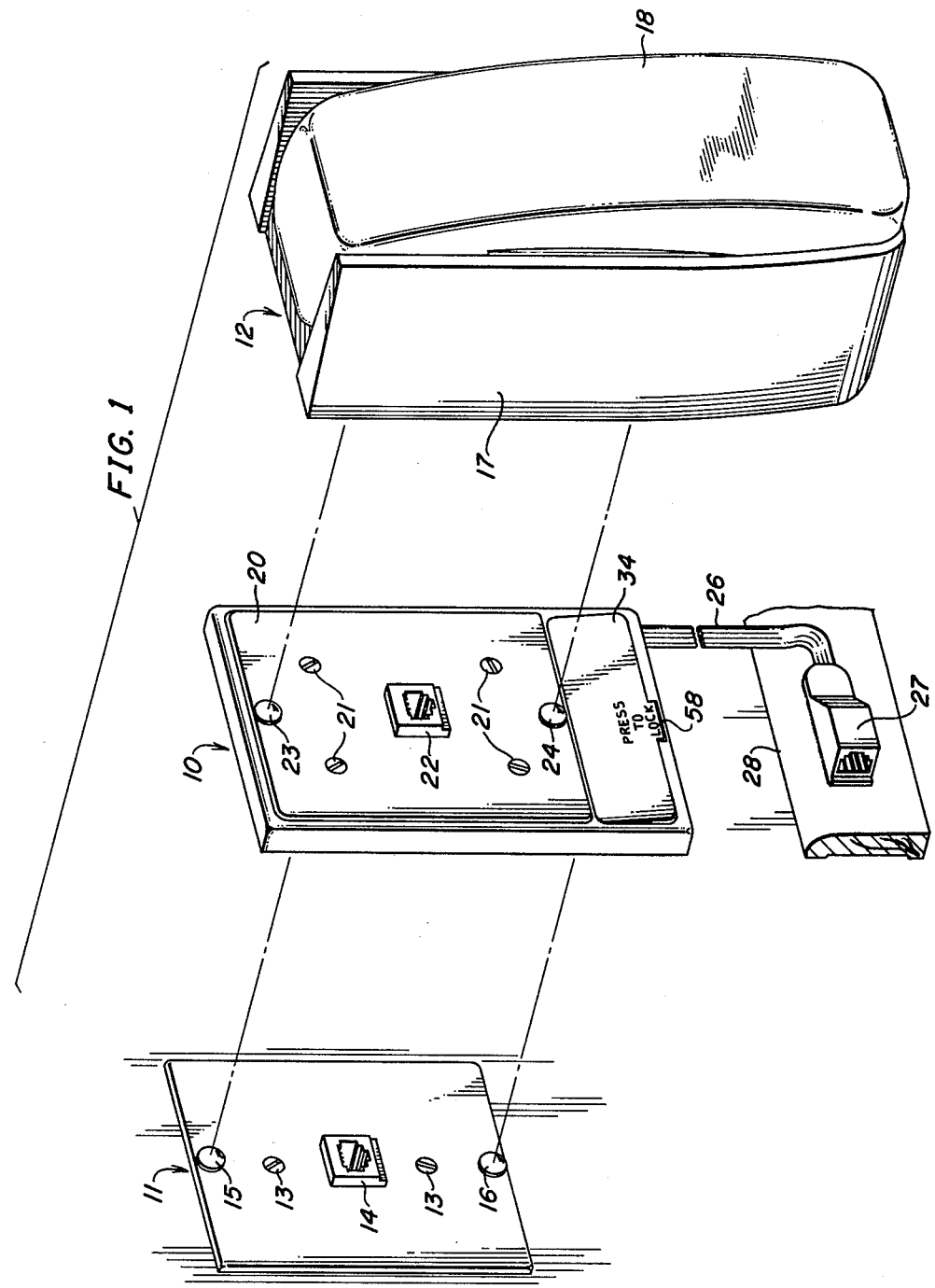
FIG. 1 depicts in perspective views, a typical wall plate receptacle, an adapter assembly according to the invention, and a typical wall telephone, the units being shown separated and in alignment before the mounting of the latter two, one upon the other and the adapter assembly before its mounting on the wall plate receptacle, the adapter assembly extension cord jack being shown affixed to a wall baseboard.

In FIG. 1 is shown an adapter assembly 10 according to the invention in its relationship to a typical wall plate receptacle 11 to which it is to be mounted and a typical wall telephone set 12 which in turn is to be mounted on adapter assembly 10. Plate receptacle 11 is conventionally mounted on a wall by screw means 13 and presents a jack outlet 14 terminating telephone wiring of the premises and has affixed thereon a pair of flanged mounting studs 15 and 16 on which studs the backplate (not visible) of the telephone cradle 17 is normally carried as is known. A handset 18 is carried by cradle 17. Adapter assembly 10 to be mounted between receptacle 11 and telephone set 12 comprises a rectangular base 19 (see also plan view of FIG. 2) having edge flanges on all four sides and presents at one portion of its face, a cavity in which the telephone wiring is concealed by a cover lid 20 maintained on base 19 by screw means 21. Cover lid 20 has extending therethrough a jack outlet 22, and has affixed to its face a pair of flanged mounting studs 23 and 24 corresponding in spacing to mounting studs 15 and 16 of wall plate receptacle 11. On its backplate, adapter 10 has extending outwardly therefrom a conventional vertically movable plug not visible in the drawing, which plug is adapted to mate with jack outlet 14 of wall plate receptacle 11. Wiring 25 (FIG. 2) extends from the adapter plug as an extension cord 26 terminating in a jack 27. The rear of the housing of jack 27 is coated with a suitable adhesive in order to facilitate its mounting on a flat surface such as, for example, a wall baseboard 28 beneath the adapter assembly 10 when it is mounted on wall plate receptacle 11 as shown before such mounting in FIG. 1. Additional wiring 29 extends from the aforementioned plug on the rear of adapter 10 to jack outlet 22 to make electrical connection with a corresponding plug, also not visible in the drawing, extending from the backplate of telephone set 12. Since the wiring and plug-in arrangements are well known in the art, they need not be further considered for an understanding of the invention. The interior of the cavity of adapter 10 is suitably contoured to provide strengthening ribs and support guides for the wiring in a manner also well known.

Figure 2:
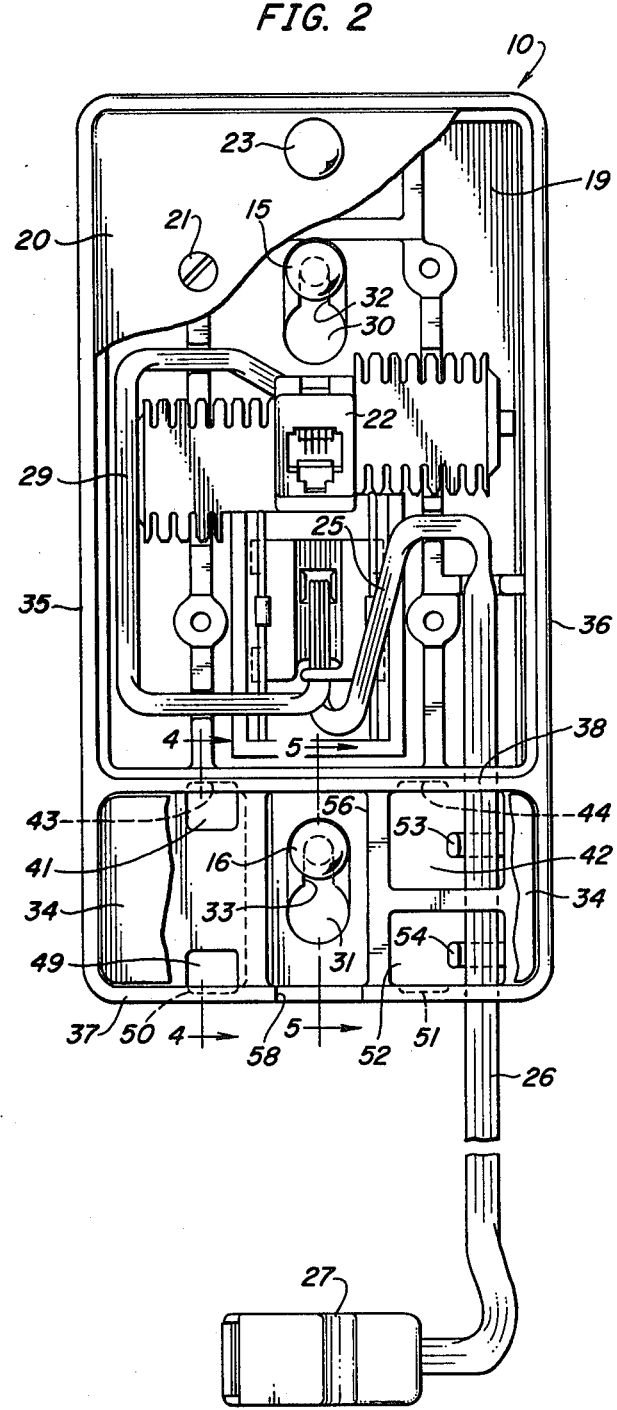
FIG. 2 is a front plan view, slightly enlarged, of the adapter assembly of FIG. 1, with portions of two cover lids broken away to disclose internal details.

In FIG. 2, adapter assembly 10 is assumed as being mounted on wall plate receptacle 11 by means of its mounting studs 15 and 16. In this familiar mounting arrangement, a pair of keyhole apertures 30 and 31 are provided in backplate 19 of adapter 10 each having an aperture of sufficient diameter to initially admit the flanged heads of mounting studs 15 and 16. Keyhole apertures 30 and 31 extend upwardly in narrowed slots 32 and 33 dimensioned to admit only the shanks of studs 15 and 16 and present on each side of a slot, flanges which capture the studs beneath the flanged heads as adapter 10 is moved downward to the ends of the slots as adapter 10 is installed. As shown in FIG. 2, this leaves the area beneath the large aperture of keyhole aperture 31, for example, open. According to one feature of the invention, this unoccupied area is advantageously put to use to achieve a novel adapter locking mechanism which may now be described.

Figure 3:
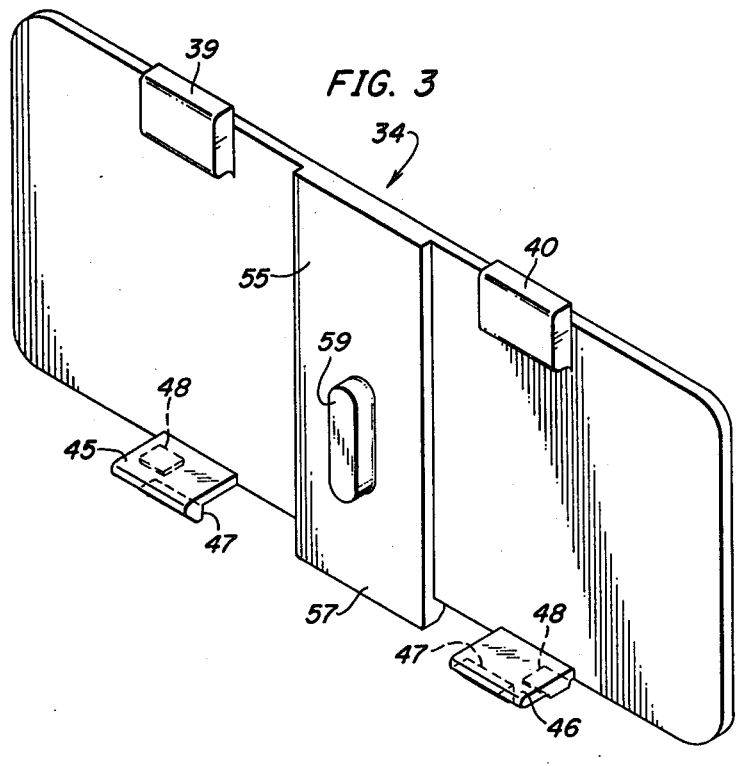
FIG. 3 is an enlarged, perspective view of the rear of the lower cover lid of the adapter assembly of FIG. 2.
Figure 4:
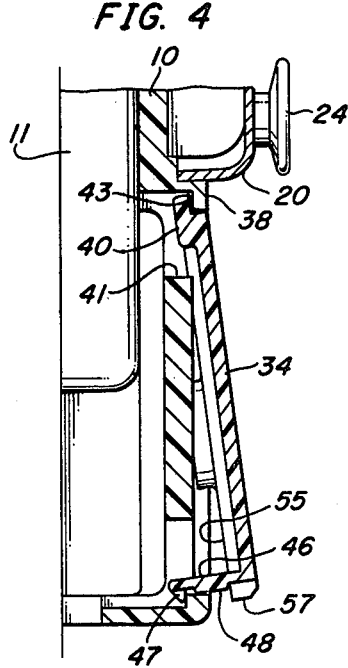
FIG. 4 is an enlarged cross-sectional view of a portion of the assembly of FIG. 2 taken along the line 4—4 showing a cross-section of the lower cover lid.

As seen in FIG. 1, the lower portion of adapter assembly 10, that including keyhole aperture 31 (FIG. 2), is covered by a second lid 34, the rear face of which is shown in enlarged perspective view in FIG. 3. Lid 34 is fitted in a frame formed in adapter assembly 10 by its side flanges 35 and 36, its lower flange 37, and an intermediate flange 38 (FIG. 2). A pair of hinge members 39 and 40 are formed on the inner face of lid 34 and project a short distance beyond the upper edge thereof, members 39 and 40 being dimensioned to fit through respective apertures 41 and 42 and thus behind flange 38 into recesses 43 and 44 undercut therein. At the lower inner edge of lid 34, a pair of latch arms 45 and 46 extend inwardly therefrom and at right angles, each having a safety detent 47 extending downward therefrom at its end and a latch protrusion 48 also facing downward. The hinge members and latch arms and their operation are more clearly seen in the sectional portion views of FIG. 4 and 5, the former showing the hinge and latch elements with lid 34 in its farthest open position. Hinge member 40 is shown fitted through adapter aperture 41 and caught behind flange 38 in recess 43. At its lower edge, latch arm 46 of lid 34 is passed through an aperture 49 in the backplate of adapter 10 and has its detent 47 caught behind lower flange 37 in a recess 50, thus restraining the outward swing of lid 34. Hinge member 39 at the other side of lid 34 is similarly caught under flange 38 in recess 44 through aperture 42 and the detent 47 of latch arm 45 is caught under flange 37 in a recess 51 through an aperture 52 in backplate 19. (Apertures 42 and 52 may be formed somewhat larger than corresponding apertures 41 and 49 to facilitate the fitting of cord 26 on supports 53 and 54 at the rear of backplate 19.)

Figure 5:
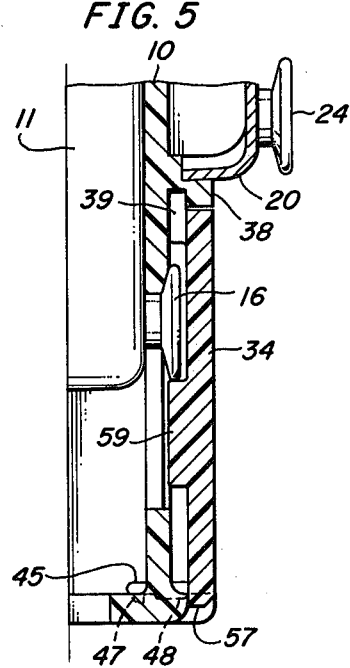
FIG. 5 is an enlarged cross-sectional view of a portion of the assembly of FIG. 2 taken along the line 5—5 showing another cross-section of the lower cover lid.

Lid 34 has centrally formed thereon on its inner face a slightly raised rib section 55 extending from its upper edge to slightly beyond its lower edge. Rib section 55, which supplies a vertical stiffening to lid 34, is dimensioned to fit into a recess 56 formed in backplate 19 when lid 34 is closed, the overhang 57 of rib section 55 fitting into a recess 58 in lower flange 37 of backplate 19. Lid 34 finally has formed on its inner face a lug 59 extending inwardly from rib section 55. As shown in FIG. 5, lug 59 is dimensioned and positioned on lid 34 so that when the latter is fully closed, lug 59 fits into the unoccupied area of keyhole aperture 31, its upper surface slidably abutting the flange edge of mounting stud 16 of wall plate receptacle 11. With adapter assembly 10 mounted on mounting studs 15 and 16 in the manner previously described and lid 34 pressed to lock as instructed on its face, lug 59 prevents any upward movement of assembly 10, and, thus, in turn prevents any inadvertent removal of the assembly. Lid 34 is locked in place by the snap action of protrusions 48 behind lower flange 37 in recesses 50 and 51. Adapter assembly 10 is freed for removal by prying lid 34 outward at overhang 57 to move lug 59 clear of the flanged head of mounting stud 16. Lid 34 is prevented from dropping out of its frame by limiting its outward swing by the latching of detents 47 of latch arms 45 and 46.

What has been described is considered to be only one illustrative adapter assembly according to the principles of the invention and it is to be understood that various and numerous other arrangements may be devised by one skilled in the art without departing from the spirit and scope thereof as limited only as defined in the accompanying claims.

What is claimed is:

1. An adapter assembly (10) for connecting one or more telephone sets (12) to a wall jack outlet (11, 14) having a mounting stud (16), said stud having a shank and a flanged head, said adapter assembly (10) comprising a backplate (19) having a keyhole aperture (31) having an enlarged region dimensioned to admit said flanged head and a slotted region (33) for admitting only said shank, an adapter jack outlet (22), electrical wiring for interconnecting said wall jack outlet (14) and said adapter jack outlet (22), electrical wiring for interconnecting said wall jack outlet (14) and said adapter jack outlet (22), and extension cord means (26) connected to said wiring terminating in an auxiliary jack outlet (27) characterized in a locking mechanism for locking said adapter assembly (10) to said wall jack outlet (11, 14) comprising a lid (34) hingedly mounted on said assembly (10) over said keyhole aperture (31), said lid (34) having a lug (59) extending inwardly from the rear surface thereof, said lug (59) being dimensioned and positioned to occupy sufficiently said enlarged region of said keyhole aperture (31) when said lid (34) is closed to prevent removal of said adapter assembly (10) over said mounting stud (16) when said shank of said mounting stud (16) is admitted in said slotted region (33).

2. An adapter assembly (10) for receiving a telephone set (12) in attachment thereto, said assembly (10) being adapted to be releasably secured to a wall-mounted receptacle (11, 14) having a pair of mounting studs (15, 16) extending outwardly therefrom and an electrical jack (14) for making connections to said telephone set (12), said adapter assembly (10) comprising a backplate (19) having a front surface for receiving said telephone set (12) and a rear surface and having first and second apertures (30, 31) adapted to receive said mounting studs (15, 16) and also having an electrical jack (22) for receiving an electrical plug, said mounting studs (15, 16) having flanged heads which cooperate with wall portions adjacent their respective apertures so that when said adapter assembly (10) is mounted to said wall plate (11), said adjacent wall portions extend behind said flanged heads to prevent removal of said adapter assembly from said plate (11), and said electrical plug being slidably supported on said backplate (19) characterized in a locking mechanism for said adapter assembly comprising a lid (34) hingedly supported on said assembly (10) over one of said apertures (31), said lid (34) having a lug (59) extending inwardly from the rear surface thereof, said lug (59) being dimensioned and positioned to occupy sufficiently said one aperture (31) when said lid is closed to prevent removal of the flanged head of a mounting stud (16) from said wall portions adjacent said one aperture (31).

3. An equipment mounting arrangement comprising a backplate of said equipment, said backplate having at least one keyhole aperture therein, said aperture being formed to present an open region dimensioned to admit the flanged head of a mounting stud and a slot region dimensioned to admit only the shank of said mounting stud, said slot having opposing flanges for clasping said flanged head when said flanged head is admitted into said open region and moved into said slot region, a lid hingedly supported by said equipment over said keyhole aperture, and a lug extending inwardly from said lid, said lug being dimensioned and positioned to occupy sufficiently said open region when said lid is closed to prevent movement of said mounting stud from said slot region to said open region when said backplate is mounted on said mounting stud.

4. In combination, an equipment mounting stud having a shank and a head having a flange larger than said shank, an equipment housing having a backplate, said backplate having a keyhole aperture having an open region dimensioned to admit said flange and a slot region dimensioned to admit only said shank, said slot region having a pair of opposing flanges for clasping said flange of said mounting stud, a lid hingedly supported by said housing over said keyhole aperture, and a lug extending inwardly from said lid, said lug being dimensioned and positioned to occupy sufficiently said open region of said keyhole aperture when said lid is closed to prevent movement of said mounting stud from said slot region to said open region.

5. An adapter assembly for receiving a telephone set in attachment thereto, said assembly comprising a wall plate, a pair of mounting studs extending from said wall plate, each of said mounting studs having a shank and a head having a flange larger than said shank, an adapter backplate having a pair of keyhole apertures adapted to receive said pair of mounting studs, each of said apertures having an open region dimensioned to admit said flange of each of said mounting studs and a slot region dimensioned to admit only said shank of each of said mounting studs, said slot region having a pair of opposing flanges for clasping said shank of each of said mounting studs, and a locking mechanism comprising a lid hingedly supported on said backplate over one of said keyhole apertures and a lug extending inwardly from the rear surface of said lid, said lug being dimensioned and positioned to occupy sufficiently said open region of said one aperture when said lid is closed to prevent removal of said adapter assembly over said head of each of said mounting studs from said slot region of said one keyhole aperture.

* * * * *